(12) United States Patent
Mane

(10) Patent No.: US 8,549,252 B2
(45) Date of Patent: Oct. 1, 2013

(54) FILE BASED VOLUMES AND FILE SYSTEMS

(75) Inventor: Virendra M. Mane, Maharashtra (IN)

(73) Assignee: EMC Corporation, Hopkinton, MA (US)

( * ) Notice: Subject to any disclaimer, the term of this patent is extended or adjusted under 35 U.S.C. 154(b) by 1722 days.

(21) Appl. No.: 11/301,975

(22) Filed: Dec. 13, 2005

(65) Prior Publication Data

US 2007/0136548 A1   Jun. 14, 2007

(51) Int. Cl.
| G06F 12/00 | (2006.01) |
|---|---|
| G06F 13/00 | (2006.01) |
| G06F 13/28 | (2006.01) |
| G06F 9/26 | (2006.01) |
| G06F 9/34 | (2006.01) |

(52) U.S. Cl.
USPC ................ 711/202; 711/100; 711/112

(58) Field of Classification Search
USPC .......................... 711/112, 165, 170
See application file for complete search history.

(56) References Cited

U.S. PATENT DOCUMENTS

| 5,819,292 | A | 10/1998 | Hitz et al. | |
|---|---|---|---|---|
| 5,893,140 | A | 4/1999 | Vahalia et al. | 711/118 |
| 6,453,383 | B1 * | 9/2002 | Stoddard et al. | 711/112 |
| 6,839,750 | B1 | 1/2005 | Bauer et al. | 709/223 |
| 6,889,309 | B1 | 5/2005 | Oliveira et al. | 711/203 |
| 7,076,509 | B1 | 7/2006 | Chen et al. | |
| 7,165,158 | B1 * | 1/2007 | Yagawa | 711/165 |
| 2004/0030668 | A1 | 2/2004 | Pawlowski et al. | |
| 2004/0030822 | A1 | 2/2004 | Rajan et al. | |
| 2005/0044162 | A1 | 2/2005 | Liang et al. | 709/212 |
| 2005/0065986 | A1 | 3/2005 | Bixby et al. | 707/204 |
| 2005/0066095 | A1 * | 3/2005 | Mullick et al. | 710/200 |
| 2005/0246382 | A1 * | 11/2005 | Edwards | 707/200 |
| 2005/0256859 | A1 * | 11/2005 | Keohane et al. | 707/4 |

OTHER PUBLICATIONS

Uresh Vahalia, *Unix Internals: The New Frontiers*, Chapter 9, "File System Implementatins," Printice-Hall, Inc., New Jersey, 1996, p. 261-289.

Mike Fogarty, "LVM and Removable IDE Drives Backup System," *Linux Journal*, linuxjournal.com, Mar. 9, 2004, 6 pages.

"Installing and Updating HP-UX 10.x HP 9000 Computers," Edition 1, Hewlett Packard Corp., Palo Alto, CA, May 1997, p. 65, 92-93, 107-117, 135-136, 160-161.

"Celerra File Server Architecture for High Availability," EMC Corporation, Hopkinton, MA, Aug. 1999.

"Celerra File Server in the E-Infostructure," EMC Corporation, Hopkinton, Mass., 2000, 9 pages.

(Continued)

*Primary Examiner* — Yaima Campos
(74) *Attorney, Agent, or Firm* — Richard Auchterlonie; Novak Druce Connolly Bove + Quigg LLP

(57) ABSTRACT

A file-mapped volume is a logical volume in which the data storage of the logical volume is the data storage of a regular file associated with the logical volume. The regular file can be a file of a first file system, and a second file system can be built upon the file-mapped volume. These two file systems can have distinct inode address spaces, yet files of the first file system are easily moved to the second file system by changing pointers to inodes of these files. The second file system can be easily copied, attached, or transported by copying, attaching, or transporting the regular file containing the second file system, yet files in the second file system can be accessed in real time via file access routines of the operating system.

9 Claims, 6 Drawing Sheets

(56) References Cited

OTHER PUBLICATIONS

"Object Storage Architecture: Defining a new generation of storage systems built on distributed, intelligent storage devices," Panasas, Fremont, CA, Oct. 19, 2003, 18 pages.

M. Factor, et al., "Object Storage: The Future Building Block for Storage Systems," IEEE-CS International Symposium, Global Data Interoperability—Challenges and Technologies, Sardinia, Italy, Jun. 23, 2005, IEEE, Piscataway, NJ, conference proceedings, pp. 119-123.

Chutani, Sailesh, et al., "The Episode File System," Carnegie Mellon University IT Center, Pittsburgh, PA, Jun. 1991, 18 pages.

Philip Trautman and Jim Mostek, "Scalability and Performance in Modern File Systems," Silicon Graphics, Mountain View, CA, printed May 6, 2005, 18 pages.

Figueirendo et al., "The PUNCH Virtual File System: Seamless Access to Decentralized Storage Services in a Computational Grid," Tenth IEEE International Symposium on High Performance Distributed Computing, Aug. 7-9, 2001, San Francisco, IEEE, Piscataway, NJ, 11 pages.

"Veritas Volume Replication and Oracle Databases," A Solutions White Paper, Veritas Software Corporation, Mountain View, CA, May 29, 2000, pp. 1-31.

S. Sikand & R. March, "Highly Scalable High Performance Perforce Server Environments," Perforce User Conference, May 2003, Las Vegas, NV, 12 pages.

Menon et al., "IBM Storage Tank—a heterogeneous scalable SAN file system," *IBM Systems Journal*, vol. 42, No. 2, 2003, pp. 250-267, IBM Corp., Armonk, NY.

"Shared Storage Cluster Computing," Panasas, Fremont, CA, Jan. 27, 2005, 22 pages.

T10 Committee, "Information technology—SCSI Object-Based Storage Device Commands-2 (OSD-2)," INCITS (International Committee for Information Technology Standards), t10.org, Revision 0, Oct. 4, 2004, 192 pages.

Virendra M. Mane, Rule 131 Declaration of Virendra M. Mane and Exhibits A, B, and C, 23 pages, published Dec. 21, 2007 in U.S. Appl. No. 11/301,957, U.S. Patent and Trademark Office, Alexandria, VA.

Uresh K. Vahalia, Rule 131 Declaration of Uresh K. Vahalia and attachments, 7 pages, published Dec. 21, 2007 in U.S. Appl. No. 11/301,957, U.S. Patent and Trademark Office, Alexandria, VA.

Brian W. Kernighan and Dennis M. Ritchie, The C Programming Language, 4.10 Recursion, 7 pages, 1988, Prentice-Hall, Upper Saddle River, NJ.

Renu Tewari, et al., Glamour: A Wide-Area Filesystem Middleware Using NFSv4, IBM Research Report RJ10368 (A0507-011), 15 pages, Jul. 12, 2005, IBM Corp., San Jose, CA.

Steve Best, How the Journaled File System cuts system restart times to the quick, 6 pages, Jan. 2000, IBM Corp., San Jose, CA.

Norbert Lester, Towards a Worldwide Distributed File System, The OSF DCE File System as an example, 13 pages, Sep. 27, 1990, Open Software Foundation.

HP JFS 33 and HP OnLine JFS 3.3 Veritas File System 3.3 System Administrator's Guide for HP-UX 11.00 and HP-UX 11i, Nov. 2000, pp. 51-72, Hewlett-Packard Corp., Palo Alto, CA.

Member Information India and the WTO, one page, Dec. 21, 2007, web page of wto.org, World Trade Organization, Geneva, Switzerland.

* cited by examiner

US 8,549,252 B2

FILE BASED VOLUMES AND FILE SYSTEMS

LIMITED COPYRIGHT WAIVER

A portion of the disclosure of this patent document contains computer code listings and command formats to which the claim of copyright protection is made. The copyright owner has no objection to the facsimile reproduction by any person of the patent document or the patent disclosure, as it appears in the U.S. Patent and Trademark Office patent file or records, but reserves all other rights whatsoever.

FIELD OF THE INVENTION

The present invention relates generally to computer data storage, and more particularly to the organization and use of files, volumes, and file systems.

BACKGROUND OF THE INVENTION

Computer data are organized in various ways to facilitate efficient storage of the data and access to the data by users, application programs, and operating systems. The data are stored in physical storage devices such as disk drives. On each physical storage device, the data are grouped into blocks of bytes. Each physical storage device can be formatted or partitioned into one or more physical volumes. Each physical volume provides a contiguous range of block addresses.

Physical volumes from a group of physical storage devices can be grouped together to form a volume group, and then a logical volume can be created on the volume group. The logical volume provides a contiguous range of logical block addresses, and a particular mapping of the logical block addresses to the physical block addresses of the storage devices. For example, the logical volume can be defined so that the contiguous logical blocks are striped across the group of storage devices. The storage devices may be organized into a Redundant Array of Inexpensive Disks (RAID) so that some of the physical blocks store redundant data or parity blocks for a particular level of RAID redundancy.

Typically a file system is built upon a logical volume so that there is a one-to-one correspondence between the file system and the logical volume. The file system is a hierarchical organization of directories and files, beginning with a root directory of the file system. Users or application programs call file system manager routines of an operating system to access directories and files of the file system, and to create or delete directories and files. For example, a user or application program provides a path name to a directory or file, and the file system manager searches the file system hierarchy for the specified directory or file.

A well-known file system organization is the Unix file system, as described in Chapter 9, pp. 261-289 of Uresh Vahalia, *Unix Internals*: The New Frontiers, 1996, Prentice Hall, Inc., Simon & Schuster, Upper Valley River, N.J. 07458. The file system is comprised of file system blocks including a respective inode for each directory or file, and direct blocks and indirect blocks for storing additional data of the directories and files.

The Linux operating system is a public-domain operating system using a Unix-based file system. The Linux operating system has a Logical Volume Manager (LVM). As described in Mike Fogarty, "LVM and Removable IDE Drives Backup System," Linux Journal, linuxjournal.com, Mar. 9, 2004, LVM has been used in the following fashion to create a logical volume and to build a file system upon the logical volume:

1. fdisk /dev/hdb
2. fdisk /dev/hdd
3. pvcreate /dev/hdb1 /dev/hdd1
4. vgcreate -s 16 M a1b1 /dev/hdb1 /dev/hdd1
5. lvcreate -L 226 g a1b1
6. mke2fs -j /dev/a1b1/1vol1
7. mkdir /mnt/back
8. mount /dev/a1b1/1vol1 /mnt/back The first two commands invoke a format disk utility "fdisk" to configure the disk drives "hdb" and "hdd" to create a partition "hdb" on the disk drive "hdb" and a partition "hdd1" on the disk drive "hdd". The third command "pvcreate" creates respective physical volumes from the partitions. The fourth command "vgcreate" creates a volume group called "a1b1" composed of the two physical volumes "/dev/hdb1" and "/dev/hdd1". The fifth command "lvcreate" creates a logical volume "a1b1", which uses all of the available storage on the volume group. The sixth command "mke2fs" creates a file system on the logical volume "a1b1". The seventh command "mkdir" creates a mount point for the file system. The eighth command "mount" is used to mount the logical volume, so that the file system on the logical volume becomes accessible to users and application programs.

By creating a logical volume from storage of a group of disk drives, users and application programs need not be concerned with how data are located on the physical storage devices. There are, however, a number of situations where the user or application program should be aware of limitations imposed by the logical volume and the file system built upon the logical volume. For example, the extent of the logical volume may set a storage limit upon file system expansion, and when a file system expands to the size of its logical volume, users or application programs may experience some delay while the logical volume is extended, for example, by the extension of the physical volumes of the volume group of the logical volume or by the addition of physical storage devices to the volume group of the logical volume. Directories and files may be moved easily within a file system or logical volume, because such movement can be preformed by changing pointers in the hierarchical organization. Users and application programs, however, may experience significant delay when moving directories or files between logical volumes, because such movement has been performed by copying data between physical storage locations. Certain operations, such as creating symbolic links or shortcuts, may be permitted within a logical volume but prohibited between logical volumes. Thus, there is a desire to reduce or eliminate restrictions imposed upon users and applications by the logical volume and the file system built upon the logical volume.

SUMMARY OF THE INVENTION

In accordance with one aspect, the present invention provides a computer-implemented method of operating data processing apparatus. The method includes configuring a logical volume of computer data storage so that the logical volume is mapped to storage of an associated file of the computer data storage. The method also includes a file system manager of an operating system of the data processing apparatus creating and maintaining a file system on the logical volume. The method further includes the file system manager accessing the associated file in response to a file access request from a user or application program for access to the file system.

In accordance with another aspect, the invention provides data processing apparatus including computer data storage, and at least one data processor coupled to the computer data storage for access to data stored in the computer data storage. The at least one data processor is programmed with an operating system defining a file-mapped volume type in which a logical volume of the computer data storage is mapped to storage of an associated file of the computer data storage. The operating system is programmed with a file system manager for maintaining file systems on logical volumes of the computer data storage. The operating system is also programmed for using the file system manager for maintaining a file system on a file-mapped volume.

In accordance with still another aspect, the invention provides data processing apparatus including computer data storage and at least one data processor coupled to the computer data storage for access to data stored in the computer data storage. The at least one data processor is programmed with an operating system including a file system manager for creating and maintaining file systems of directories and data files in the computer data storage. The computer data storage contains a first one of the file systems. The first one of the file systems includes a data file in the computer data storage. The operating system is programmed for using the file system manager for creating and maintaining a second one of the file systems in the computer data storage included in the data file.

BRIEF DESCRIPTION OF THE DRAWINGS

Additional features and advantages of the invention will be described below with reference to the drawings, in which.

Figure 1:
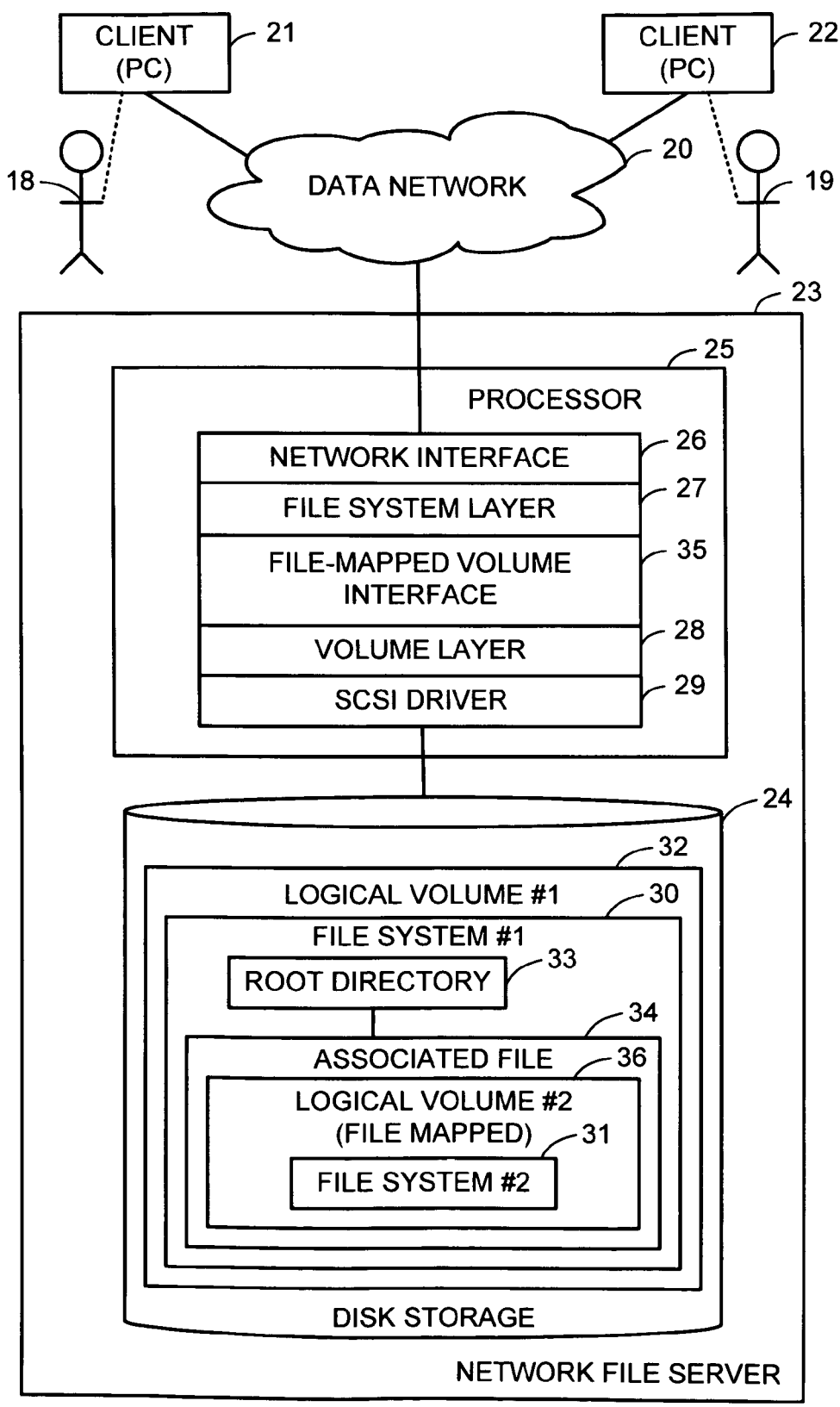
FIG. 1 is a block diagram of a data processing network including client computers and a file server for serving the client computers, in which the operating systems of the client computers and the network file server recognize certain logical volumes that have been mapped to associated files.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

With reference to FIG. 1, there is shown a data network 20 linking client computers 21, 22 of respective human users 18, 19 to a network file server 23. The network file server 23 includes disk storage 24 such as one or more disk drives, and a processor 25 programmed for responding to client requests for access to the disk storage.

The processor 25 includes a number of program layers, including a network interface 26 for coupling to the data network, a file system layer 27 for organizing data into a hierarchical file systems of files and directories, a volume layer 28 for organizing data into logical volumes of data blocks, and a Small Computer System Interface (SCSI) driver 29 for linking the volume layer 28 to the disk storage 24.

The file system layer 27 provides access to file systems 30 and 31 in the disk storage 24. A suitable kind of file system is the UNIX file system, as described in Chapter 9, pp. 261-289 of Uresh Vahalia, *Unix Internals*: The New Frontiers, 1996, Prentice Hall, Inc., Simon & Schuster, Upper Valley River, N.J. 07458. The file system layer 27 is further described in Vahalia et al. U.S. Pat. No. 5,893,140 issued Apr. 6, 1999, entitled "File Server Having a File System Cache and Protocol for Truly Safe Asynchronous Writes," incorporated herein by reference.

A first file system 30 is built on a first logical volume 32 that is created and accessed in a conventional fashion. The first logical volume 32 is created by calling an operating system routine of the volume layer 28, and the first logical volume 32 is accessed by sending a volume I/O request to the volume layer. The volume layer 28 responds to a request to create a logical volume by recording a volume name and attributes for the logical volume, allocating disk storage for the logical volume, and establishing a mapping between logical block addresses of the logical volume and physical addresses of storage blocks on disk drives of the disk storage 24. The volume layer 28 responds to a volume I/O request for access to specified logical blocks of a specified volume by recalling the logical-to-physical block mapping for the specified volume and using this logical-to-physical block mapping in order to formulate read or write requests to the corresponding physical blocks of the disk storage 24.

In accordance with an aspect of the present invention, a second logical volume 36 is created upon data storage of an associated file 34 of the first file system 30. This second logical volume 36 is created by the operating system of the network file server 23 recording a volume name and a "file-mapped" attribute for the second logical volume, and also recording a specification of the associated file 34 as another attribute of the second logical volume. The "file-mapped" attribute indicates that the logical storage blocks for the logical volume 36 are the logical storage blocks of the associated file. Thus, a volume I/O request for access to specified logical blocks of the logical volume 36 can be interpreted as a file I/O request for access to the same specified logical blocks of the file 34 associated with the second logical volume 36.

In accordance with another aspect of the present invention, a second file system 31 is built upon the second logical volume 36. The second file system 31 has a file system inode organization and namespace separate from the inode organization and namespace of the first file system 30, yet the two inode organizations and namespaces are linked by the associated file 34, and the logical block address space of the second file system 31 is a subset of the logical block address space of the first file system. The first and second file systems appear to be separate file systems, except for the associated file, which functions as a container for the second file system. File system blocks are moved easily between the first and second file systems by changing pointers to the file system blocks. This is especially useful for taking data or attributes from the first file system and putting them in the second file system so that the data or attributes are hidden from users or packaged in a file for convenient copying, backup, or transport.

Figure 2:
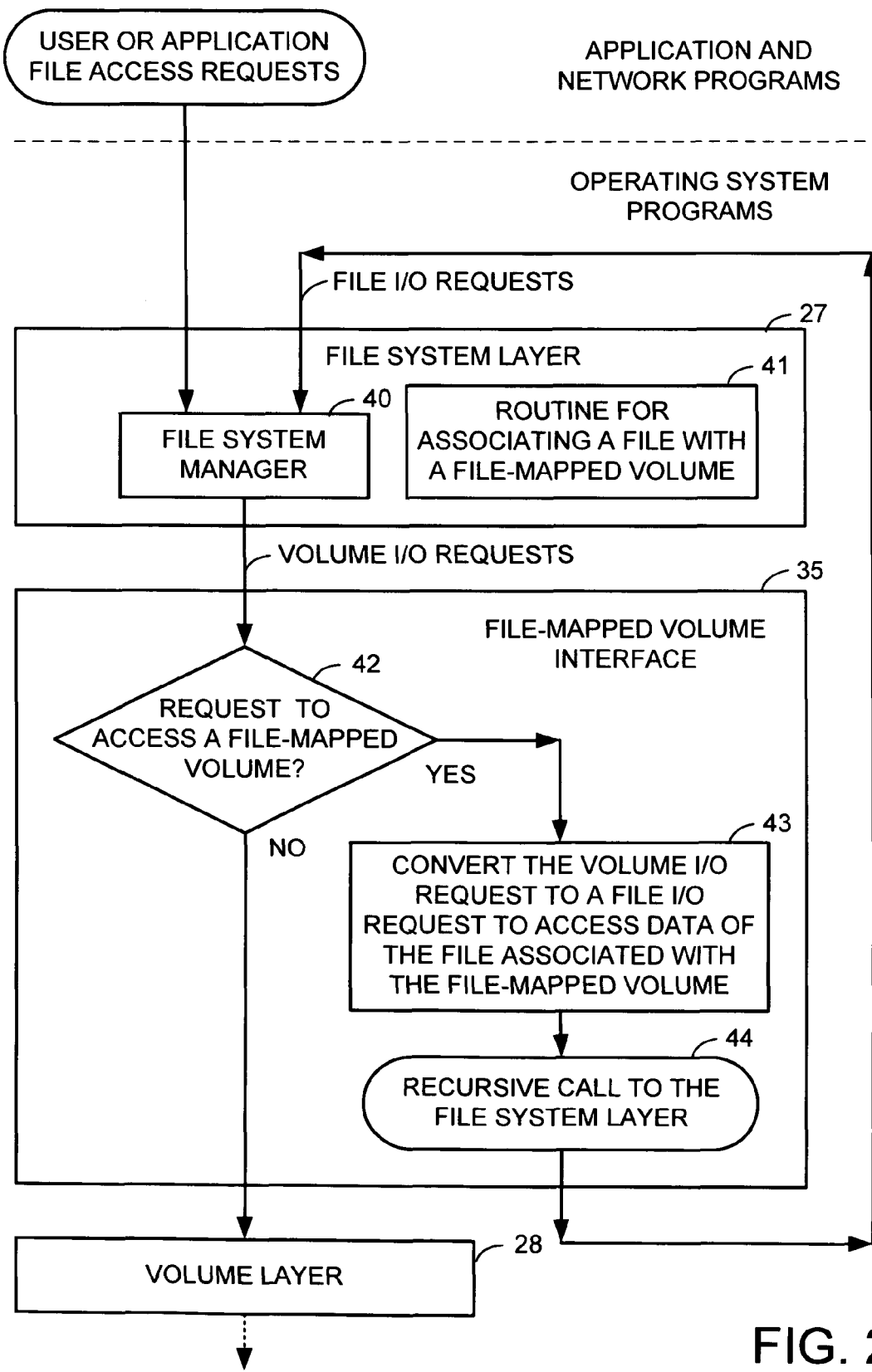
FIG. 2 is a flow diagram showing a flow of file access requests, volume I/O requests, and file I/O requests through a file system layer and a file-mapped volume interface introduced in FIG. 1.

As shown in FIG. 2, the operating system programs of the file server of FIG. 1 are easily modified to support file-mapped volumes and file systems built upon file-mapped volumes. These modifications include adding a program routine 41 for associating a file with a file-mapped logical volume, and a file-mapped volume interface 35 for interpreting a request from the file system manager 40 for I/O access to a file-mapped logical volume as a request for I/O access to the associated file.

When a file becomes associated with a file-mapped logical volume, the association is defined conveniently by setting attributes for the associated file and the file-mapped logical volume. For example, the associated file takes on the attributes of being associated with a particular file-mapped logical volume. The new attributes of the associated file are conveniently express as a new file type (associated file for containing a logical volume or file system) and the volume name of the file-mapped logical volume that uses the storage of the associated file. The file-mapped logical volume takes on the attributes of being mapped to a particular file. The new attributes of the file-mapped logical volume are conveniently expressed as a new logical volume type (file-mapped volume) and the name of the associated file to which the storage of the file-mapped logical volume is mapped.

The file server may use an operating system or volume layer 28 that configures logical volumes in a fashion similar to the Linux LVM as described above. For example, a new volume class "FileMappedVolume" is defined as follows:

```
class FileMappedVolume : public LVolume {
    const char* fileName;
    FILE*       fp;
protected:
    virtual VolumeErrno    referenceParents ( );
    virtual void dereferenceParents ( );
public:
    FileMappedVolume::FileMappedVolume(const char* volName,
        const char* fileName,
        BlockCount blocks,
        ByteCountInBlock bytesPerBlock);
```

For example, the routine 41 for associating a file with a file-mapped logical volume is a routine in the command parser for the command that configures logical volumes. Such a command parser is modified to recognize a new sub-option called "filemapped" corresponding to the new volume class, and the volume configuration command has the following syntax: volume filemapped vol-name file-name file-size
Where:
Vol-name: name given to the volume
File-name: absolute file-name of the file to be used for the volume
File-size: size of the file in sectors (512 byte blocks)
For example, to build a file-mapped volume having a size of 10 Mb (20480 sectors), create a file of size 10 Mb (mkfile -n 10 m /disk1/mapvol) on a file system. Then issue the following config command:
volume filemapped mapvol /disk1/mapvol 20480
After the file-mapped volume is successfully built, conventional file system commands can be used to build a file system on the volume in the usual fashion. For example, to build and use a Unix-based file system on the file-mapped volume as configured above, issue following config commands:
file build ufs mapvol=11 b=8192 f=8192 s=20480 t=64 u=32
file mount ufs rw /finfs mapvol=11
export /finfs anon=0

As shown in FIG. 2, the file-mapped volume interface 35 responds to each volume I/O request by determining in step 42 whether or not the volume I/O request is a request to access a file-mapped volume. If the volume I/O request is a request to access a file-mapped volume, then in step 43 the volume I/O request is converted to a file I/O request to access data of the file associated with the file-mapped volume. The file access request is sent back to the file system layer 27 as a recursive call 44. In step 42, if the volume I/O request is not a request to access a file-mapped volume, then the volume I/O request is sent down to the volume layer 28. Thus, access to a file-mapped volume involves reading or writing to the data storage of the associated file. Following is a specific example of program instructions for accessing a file-mapped volume by opening the associated file and reading or writing to the associated file:

```
FileMappedVolume::FileMappedVolume(const char *volName,
        const char* fName,
        BlockCount blocks,
        ByteCountInBlock bytesPerBlock)
        : LVolume (volName, 0, VOLUME_FILEMAPPED,
            blocks, bytesPerBlock),
            fileName(fName)
{
    fp = fopen(fileName, "r+");
    if(!fp) {
        logIO::logmsg (LOG_STORAGE, LOG_ERR,
            "%s: could not open.", fileName);
    }
}
FileMappedVolume::readBlockInternal(DiskIO_IRP* irp, BlockIO_Priority pri)
{
    LVOLUME_assert(irp->buffer( ) != NULL);
    LVOLUME_assert((irp->nbytes( ) % getBlockSize( )) == 0);
    off_t readOff = (irp->blockno( )) * getBlockSize( );
    int retVal = fseek(fp, readOff, SEEK_SET);
    if (retVal != 0) {
        logIO::logmsg (LOG_STORAGE, LOG_ERR,
            "FileMappedVolume - %s, readBlockInternal could not seek"
            "to offset %ld\n", volumeName_internal, readOff);
    }
    retVal = fread(irp->buffer( ), irp->nbytes( ), 1, fp);
    if (retVal == 0) {
        logIO::logmsg (LOG_STORAGE, LOG_DEBUG,
            "FileMappedVolume - %s, readBlockInternal could not read"
            "%ld bytes\n", volumeName_internal, irp->nbytes( ));
```

```
            return BlockIO_DeviceError;
    }
    return BlockIO_OK;
}
FileMappedVolume::writeBlockInternal(DiskIO_IRP* irp, BlockIO_Priority pri)
{
    LVOLUME_assert(irp->buffer( ) != NULL);
    LVOLUME_assert((irp->nbytes( ) % getBlockSize( )) == 0);
    off_t writeoff = (irp->blockno( )) * getBlockSize( );        // offset in file
    int retVal = fseek(fp, writeoff, SEEK_SET);
    if (retVal != 0) {
            logIO::logmsg (LOG_STORAGE, LOG_ERR,
                    "FileMappedVolume - %s, writeBlockInternal could not seek"
                        "to offset %ld\n", volumeName_internal, writeOff);
            return BlockIO_DeviceError;
    }
    return BlockIO_OK;
}
```

Besides processing volume I/O requests, there are some other situations where it may be desirable to handle file-mapped volumes in a way different from regular volumes that are not file-mapped. For example, recovery after a system crash may normally be done by accessing a file system log when the file systems to be recovered are unmounted. Typically the file system log for a file system is stored on the logical volume upon which the file system is built so that the file system log for a file-mapped file system might not be available until the mounting of the file system of the associated file containing the file-mapped logical volume upon which the file-mapped file system is built. Thus, a conventional file system recovery program may return an error indicating that the file system log for a file-mapped file system is not found (because the file system log would be in an unmounted file system at that time). This problem could be solved by storing the file system log for a file-mapped file system in a logical volume other than in the logical volume upon which the file-mapped file system is built. The recovery process also could be performed in stages. The recovery program could be run first upon the logs for file systems in the regular logical volumes (not file-mapped). Then the recovery program could be run upon the logs for file systems in the file-mapped logical volumes mapped to files of the recovered file systems. This process could be repeated to whatever level of recursion is permitted and would occur with respect to the recursive call 44 in FIG. 2.

There are some other situations where it may be desirable to modify the operating system so that it operates differently upon file-mapped volumes than regular (non file-mapped) volumes. It may be desirable for storage and operating system resources to be used more efficiently for file-mapped volumes because the file-mapped volume must use less storage than the storage of the regular logical volume that contains the file-mapped volume, and because of the recursion in FIG. 2. For example, thread stack size may be a more important limitation for I/O upon the file-mapped volumes so it would be desirable to make this I/O more efficient to save stack fames. Attributes, limits, and options for a file-mapped volume should also be consistent with the attributes, limits, and options for the associated file and the file systems and logical volumes containing the associated file. For example, the associated file should be a read-write file for read-write access to the file-mapped file system or for maintenance of a file access time attribute for read access to a read-only file-mapped file system.

Figure 3:
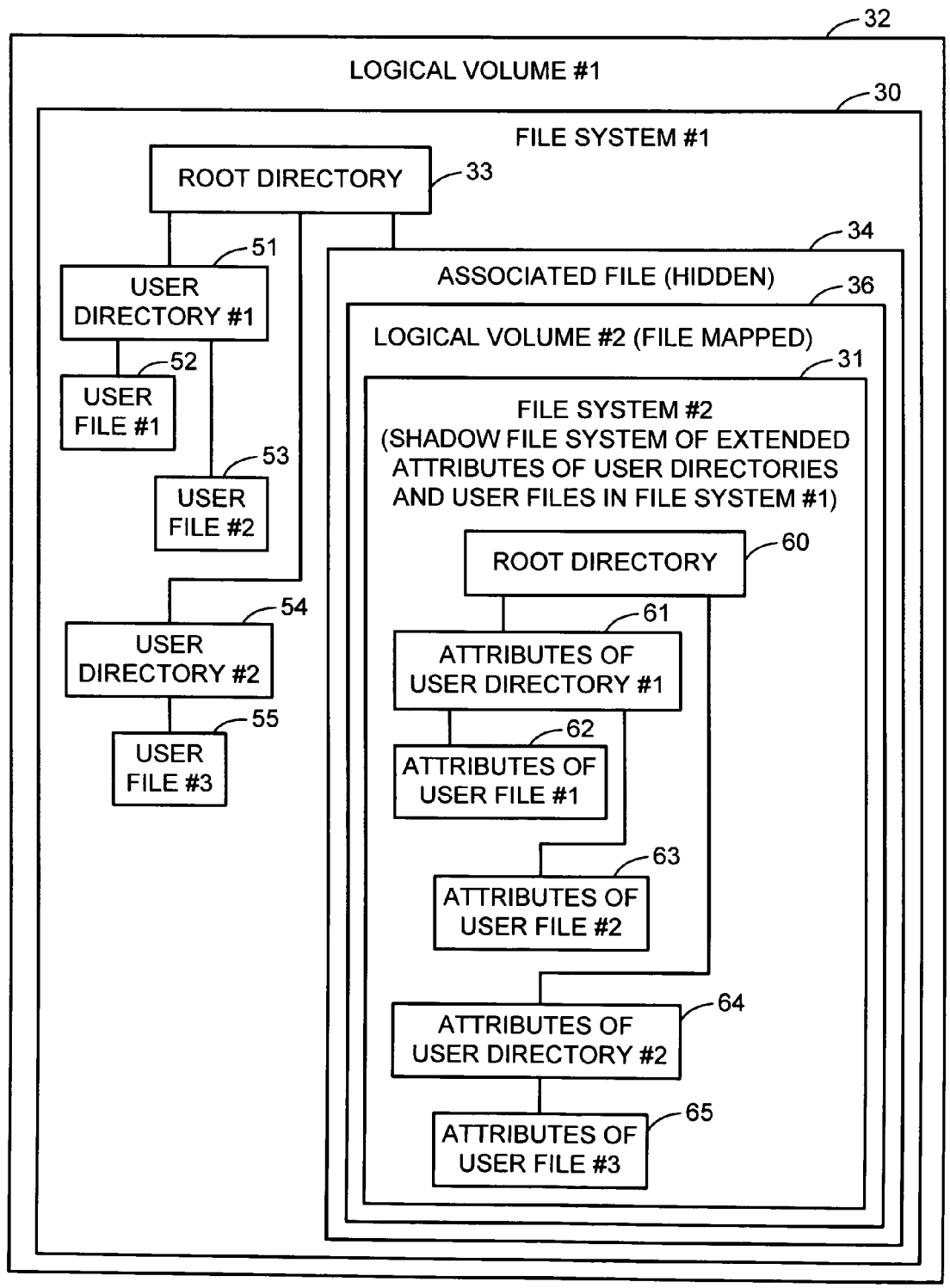
FIG. 3 is a block diagram showing a file-mapped logical volume containing a shadow file system of directories and files containing extended attributes of corresponding user directories and user files.

FIG. 3 shows an example of using the file-mapped file system 31 for storing system data in the same file system as user data and organizing the system data in the same way as the user data but in a separate block and inode space. The first file system 30 includes a root directory 33, the associated file 34, and a number of user directories and user files. The user directories and user files include a first user directory 51, a first user file 52 and a second user file 53 in the first user directory 51, a second user directory 54, and a third user file 55 in the second user directory 54. The second file system 31 includes a root directory 60 and a number of respective directories and files containing system data corresponding to the user directories and user files. The second file system 31 includes a corresponding inode for each user directory or user file in the first file system 30. Thus, the second file system includes a directory 61 of system data with respect to the first user directory, a file 62 of system data with respect to the first user file, a file 63 of system data with respect to the second user file, a directory 64 of system data with respect to the second user directory, and a file 65 of system data with respect to the third user file. The system data, for example, are extended attributes of the user directories and user files, and this system data are hidden from the user by setting a "hidden file" attribute for the associated file 34.

By putting the system data in a file-mapped file system, the system data can be hidden easily from the user and organized in corresponding files in the same way as the user data. Space management for the system data is automatic as the user and system files are created and deleted. The file system layer dynamically allocates storage for data blocks as data are written to the file-mapped file system, and the quota for the first file system 30 is shared between the system files in the second file system and the user directories and user files.

Figure 4:
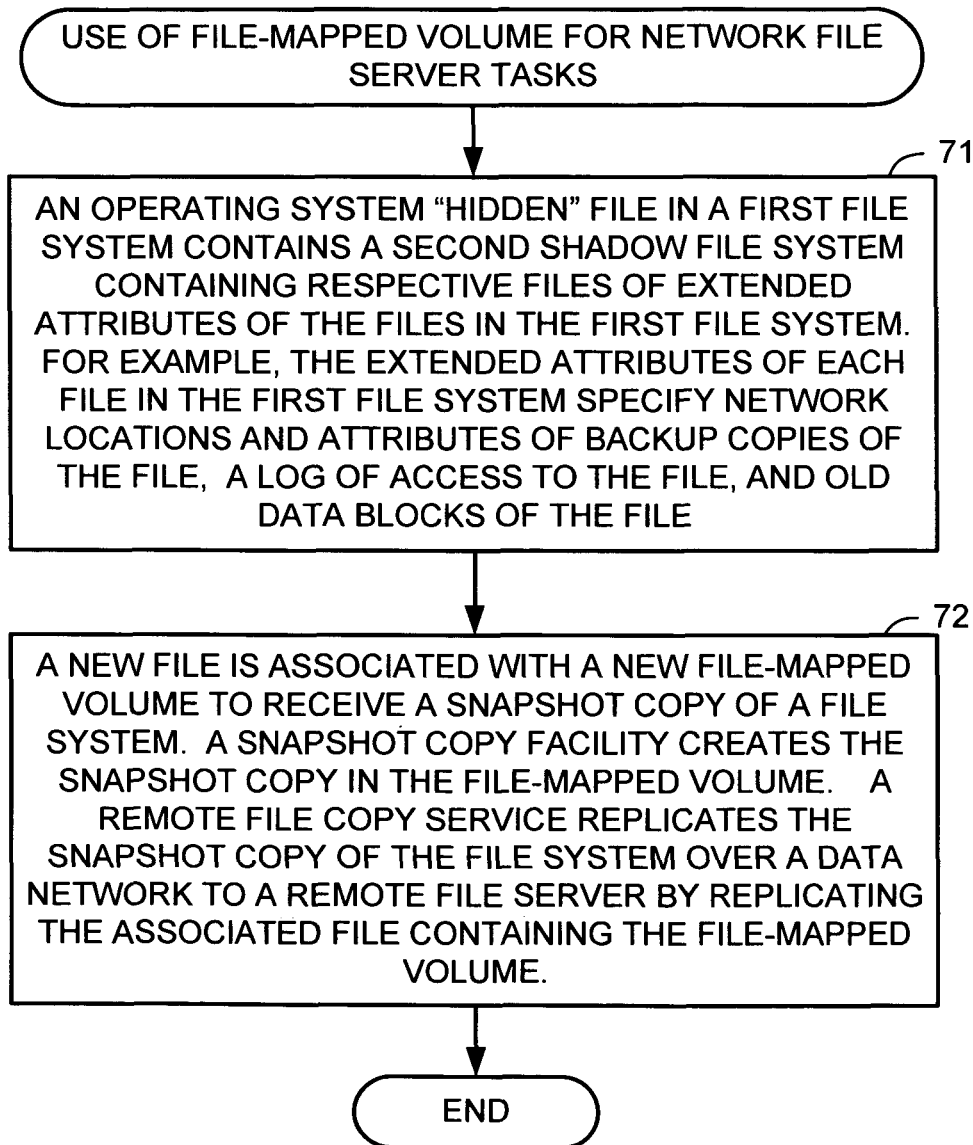
FIG. 4 is a flow chart showing uses of file-mapped volumes for network file server tasks.

FIG. 4 shows ways of using the data structure of FIG. 3. A first step 71 of FIG. 4 shows a specific example in which an operating system "hidden" file in the first file system contains a second "shadow" file system containing respective files of extended attributes of the files in the first file system. For example, the extended attributes of each file in the first file system may specify network locations and attributes of backup copies of the file, and may include a log of access to the file, or old data blocks of the file. Such extended attributes can be accessed by a recovery program in an attempt to restore a user directory or file when the user directory or user file becomes corrupted or when a transaction is aborted.

A second step 72 shows another specific example in which the extended attributes are data blocks of a snapshot copy of the user directories and user files. A new file is associated with a new file-mapped volume to contain a file-mapped volume upon which is built a snapshot copy file system. The snapshot copy file system includes snapshot copies of the user directories and user files in the first file system. Whenever a new data block is first written to a user directory or user file after the time of creation of the snapshot copy, the old version of the data block is moved to the file-mapped file system by unlinking it from the inode of the user directory or user file, and linking it to a corresponding inode in the file-mapped file system. The file version set could be maintained by a snapshot copy facility as described in Bixby et al., "Maintenance of a File Version Set Including Read-Only and Read-Write Snapshot Copies of a Production File," U.S. Patent Publication No. 2005/0065986 published Mar. 24, 2005. The entire snapshot copy file system is then sent to backup or remote storage by transmitting a copy of the associated file to backup or remote storage using a conventional facility for the backup or remote copy of a file.

Figure 5:
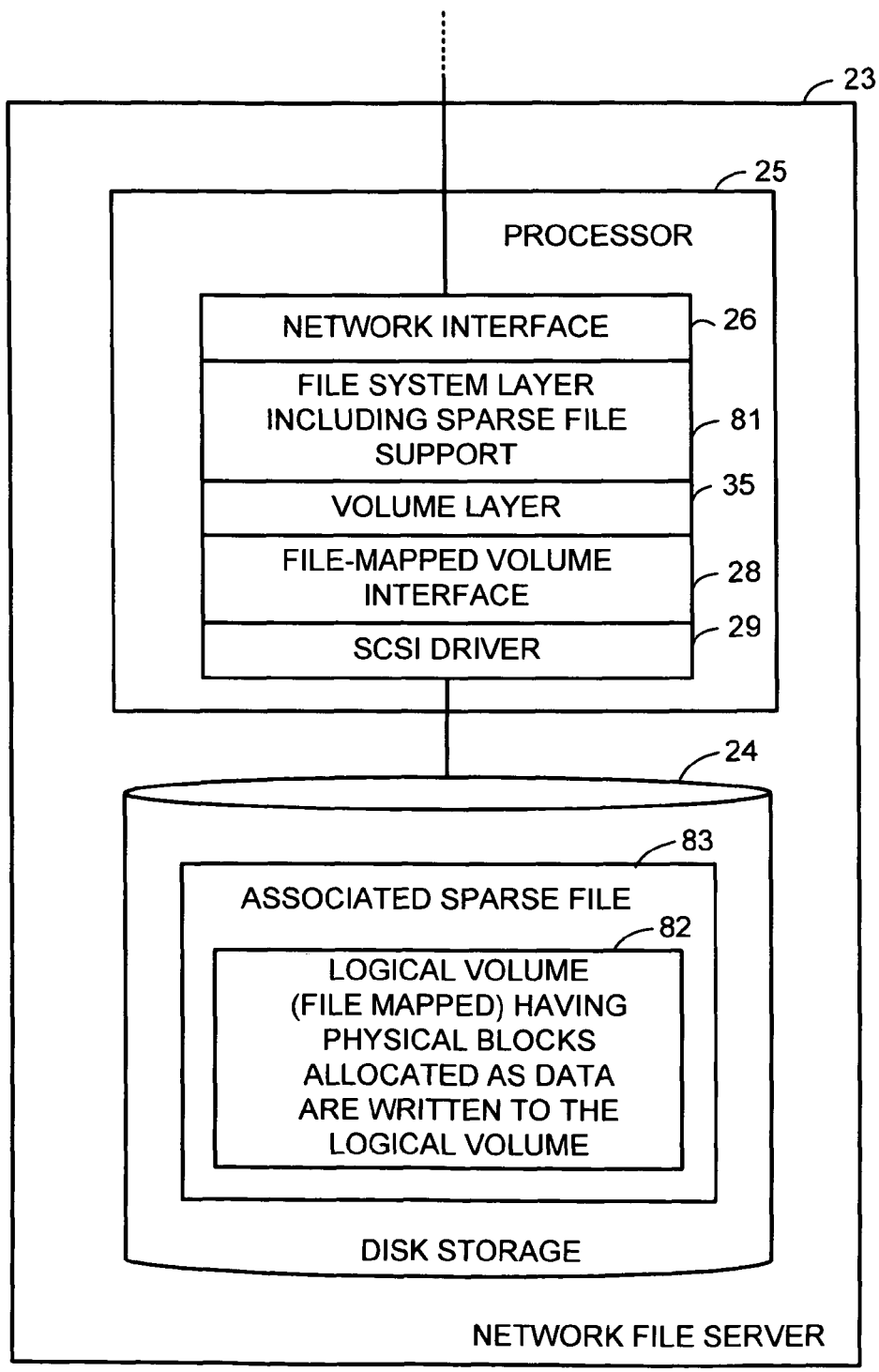
FIG. 5 shows mapping of a logical volume to a sparse file.

A file-mapped volume can also be used to create a logical volume having more logical blocks than the number of physical blocks presently allocated to the logical volume. In other words, the file-mapped volume can be a useful tool for "thin provisioning." As shown in FIG. 5, a convenient way of providing such thin provisioning is to use a file system layer 81 providing sparse file support and to map a logical volume 82 to a sparse file 83. Many file systems, such as UFS, XFS, and NTFS, support sparse files. A sparse file has an extent of data that is less than the storage allocated to the file. In a sparse file, the data blocks that do not have allocated storage are presumed to be filled with zeros. Typically, a file system that supports sparse files permits a sparse file to be constructed in which a file block within the extent of the file is not allocated unless data have been written to the block. In this case, the physical blocks of storage for a logical volume mapped to such a sparse file will not be allocated until data are written to the logical blocks of the logical volume.

Figure 6:
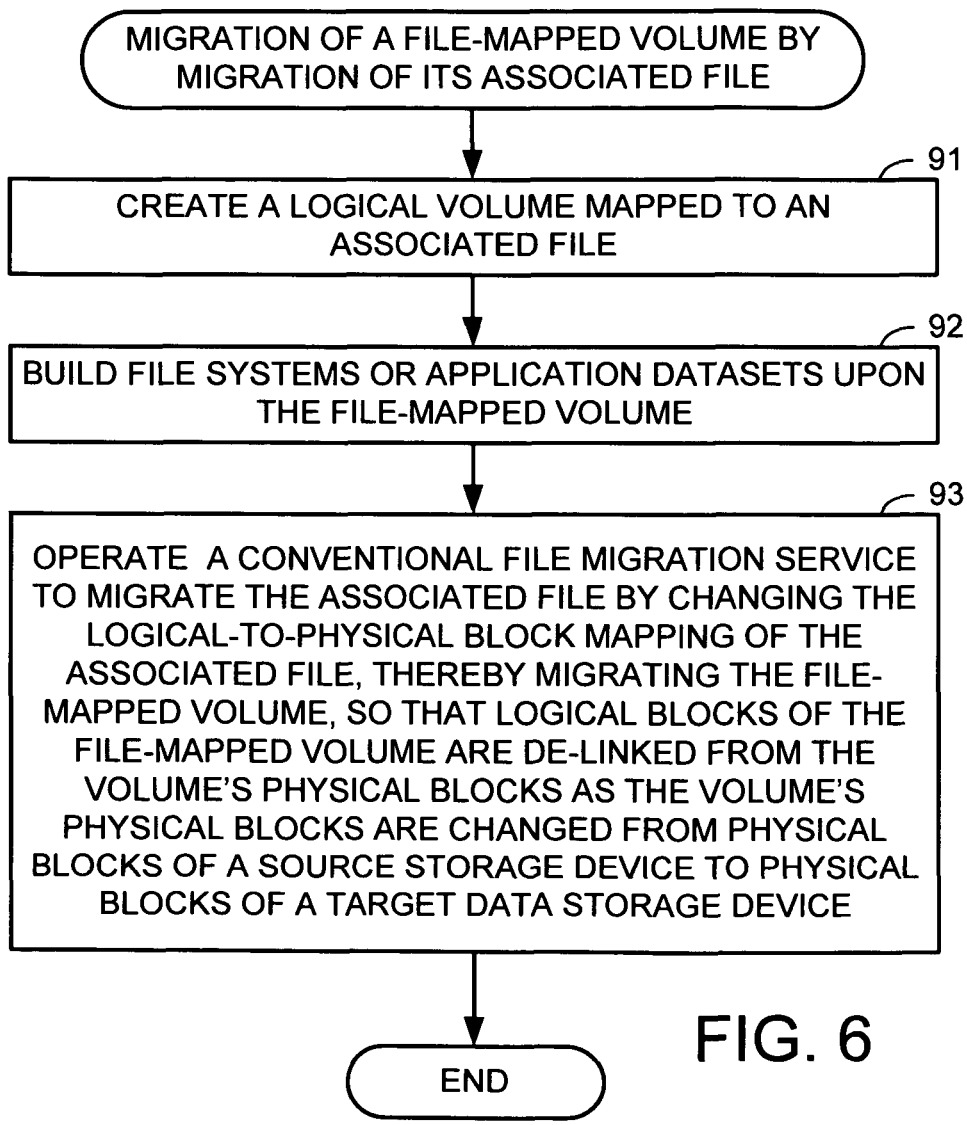
FIG. 6 shows migration of a file-mapped volume.

Another advantage of a file-mapped volume is that it provides an abstraction layer for the logical volume, which allows the logical blocks of the file-mapped volume to be de-linked from the volume's physical blocks. So if the physical blocks need to be moved, it can be more easily done without affecting applications or file systems built on the file mapped volume. For example, during sequential movement of the physical blocks (for example in a data migration process in which data are copied from a source data storage device to a target data storage device), a corresponding sequence of changes are made concurrently to the logical-to-physical block mapping of the file to which the volume is mapped. In particular, as shown in FIG. 6, a conventional file migration service can be used to migrate file systems or application datasets by creating a logical volume mapped to an associated file (step 91), building the file systems or application datasets upon the file-mapped volume (step 92), and then migrating the associated file using a conventional file migration service (step 93) during which the logical blocks of the file-mapped volume are de-linked from the volume's physical blocks as the volume's physical blocks are changed from physical blocks of a source data storage device to physical blocks of a target data storage device.

In view of the above, an operating system of a file server or a user's computer supports a new volume type called a file-mapped volume. A file-mapped volume is a logical volume in which the data storage of the logical volume is the data storage of a regular file associated with the logical volume. The regular file can be a file of a first file system, and a second file system can be built upon the file-mapped volume. These two file systems can have distinct inode address spaces, yet the data storage of the second file system is contained within the data storage of the first file system. Thus, the second file system is useful for containing extended attributes or hiding system attributes of the first file system. Files of the first file system are easily moved to the second file system by changing pointers to inodes of these files. The second file system can be easily copied, attached, or transported by copying, attaching, or transporting the regular file containing the second file system. Yet files in the second file system can be accessed in real time via file access routines of the operating system. For example, the operating system converts a volume I/O request for access to a file-mapped volume into a file access request for access to the file associated with the file-mapped volume.

What is claimed is:

1. A computer-implemented method of operating a data processing apparatus, said method comprising:
configuring a logical volume of computer data storage so that the logical volume is mapped to storage of an associated file of the computer data storage and the logical volume is contained in the associated file;
a file system manager of an operating system of the data processing apparatus creating and maintaining a file system on the logical volume; and
the file system manager accessing the associated file in response to a file access request from a user or application program for access to the file system;
which includes the file system manager producing a volume I/O request for access to the logical volume in response to the file access request from the user or application program, and the operating system converting the volume I/O request to a file I/O request to access the associated file and returning the file I/O request to the file system manager; and
wherein the configuring of the logical volume of computer data storage so that the logical volume is mapped to storage of the associated file of the computer data storage and the logical volume is contained in the associated file includes setting a file-mapped logical volume type attribute of the logical volume and setting an associated file name attribute of the logical volume to specify that the associated file is the associated file for containing the logical volume; and
the operating system converting the volume I/O request to a file I/O request to access the associated file includes the operating system producing the file I/O request to access the associated file in response to finding that the logical volume has the file-mapped logical volume type attribute and an associated file name attribute specifying the associated file.

2. The computer-implemented method as claimed in claim 1, wherein the operating system returns the file I/O request to the file system manager by sending a recursive call to the file system manager for reading or writing to the associated file.

3. The computer-implemented method as claimed in claim 1, wherein the file system manager has support for sparse files, the logical volume has more logical blocks than the number of physical blocks allocated to the logical volume, the associated file is a sparse file supported by the file system manager, and the file system manager allocates physical blocks to the logical volume as data are written to the logical volume.

4. The computer-implemented method as claimed in claim 1, wherein the configuring of the logical volume of computer data storage so that the logical volume is mapped to storage of the associated file of the computer data storage and the logical volume is contained in the associated file further includes setting an associated file type attribute of the associated file and setting a volume name attribute of the associated file to specify that the logical volume is the file-mapped logical volume that uses the storage of the associated file.

5. A data processing apparatus comprising:
computer data storage; and
at least one data processor coupled to the computer data storage for access to data stored in the computer data storage;
wherein said at least one data processor is programmed with an operating system defining a file-mapped volume type in which a logical volume of the computer data storage is mapped to storage of an associated file of the computer data storage and the logical volume is contained in the associated file; and
said at least one data processor is programmed to configure the logical volume of computer data storage so that the logical volume is mapped to storage of the associated file of the computer data storage by setting a file-made logical volume type attribute of the logical volume and setting an associated file name attribute of the logical volume to specify that the associated file is the associated file for containing the logical volume; and
wherein the operating system is programmed with a file system manager for maintaining file systems on logical volumes of the computer data storage, and the operating system is programmed for using the file system manager for maintaining a file system on a file-mapped volume; and
the operating system is programmed with a file mapped volume interface that, when executed by said at least one data processor, receives a volume I/O request from the file system manager for access to the logical volume and converts the volume I/O request to a file I/O request to access the associated file by producing the file I/O request to access the associated file in response to finding that the logical volume has the file-mapped logical volume type attribute and an associated file name attribute specifying the associated file, and returns the file I/O request to the file system manager.

6. The data processing apparatus as claimed in claim 5, wherein the file mapped volume interface returns the file I/O request to the file system manager by sending a recursive call to the file system manager for reading or writing to the associated file.

7. The data processing apparatus as claimed in claim 5, wherein the operating system includes a volume layer for responding to volume I/O requests for access to the computer data storage of the logical volumes, a file system program layer including the file system manager for processing file access requests from users or applications, and a file-mapped volume interface layer between the file system layer and the volume layer, the file-mapped volume interface layer including the file-mapped volume interface and being programmed to receive volume I/O requests from the file system layer for access to specified logical volumes, and
when a volume I/O request from the file system layer is not a request for access to a specified file-mapped volume, to pass the volume I/O request from the file system layer to the volume layer.

8. The data processing apparatus as claimed in claim 5, wherein the file system manager has support for sparse files, the logical volume has more logical blocks than the number of physical blocks allocated to the logical volume, the associated file is a sparse file supported by the file system manager, and when executed by said at least one data processor, the file system manager allocates physical blocks to the logical volume as data are written to the logical volume.

9. The data processing apparatus as claimed in claim 5, wherein said at least one data processor is further programmed to configure the logical volume of computer data storage so that the logical volume is mapped to storage of the associated file of the computer data by setting an associated file type attribute of the associated file and setting a volume name attribute of the associated file to specify that the logical volume is the file-mapped logical volume that uses the storage of the associated file.

* * * * *